(12) United States Patent
Bireley et al.

(10) Patent No.: US 7,779,047 B2
(45) Date of Patent: Aug. 17, 2010

(54) PLUGGABLE MERGE PATTERNS FOR DATA ACCESS SERVICES

(75) Inventors: William Robert Bireley, Morgan Hill, CA (US); Delmar Eugene Blevins, Los Gatos, CA (US); Stephen Andrew Brodsky, Los Gatos, CA (US); Anshul Dawra, San Jose, CA (US); Swaminathan Gounder, San Jose, CA (US); Timo Juhani Salo, Cary, NC (US); Brandon Jacob Wright Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 11/767,450

(22) Filed: Jun. 22, 2007

(65) Prior Publication Data

US 2008/0320019 A1 Dec. 25, 2008

(51) Int. Cl.
*G06F 17/30* (2006.01)
(52) U.S. Cl. ...................................... 707/803; 707/792
(58) Field of Classification Search ................. 707/1–5, 707/10, 100–101, 104.1, 103 R, 103 Y, 103 Z
See application file for complete search history.

(56) References Cited

U.S. PATENT DOCUMENTS

| | | | |
|---|---|---|---|
| 5,909,570 A * | 6/1999 | Webber | 703/13 |
| 6,591,277 B2 | 7/2003 | Spence et al. | |
| 6,718,372 B1 | 4/2004 | Bober | |
| 6,718,732 B1 | 4/2004 | Kovara et al. | |
| 7,200,668 B2 | 4/2007 | Mak et al. | |
| 7,490,331 B2 * | 2/2009 | Beisiegel et al. | 719/313 |
| 7,532,617 B2 * | 5/2009 | Birch et al. | 370/352 |
| 2003/0135825 A1 * | 7/2003 | Gertner et al. | 715/513 |
| 2003/0172113 A1 | 9/2003 | Cameron et al. | |
| 2003/0182450 A1 | 9/2003 | Ong et al. | |
| 2005/0102313 A1 * | 5/2005 | Levering et al. | 707/102 |
| 2005/0120014 A1 * | 6/2005 | Deffler | 707/4 |
| 2005/0182758 A1 * | 8/2005 | Seitz et al. | 707/3 |
| 2006/0080426 A1 * | 4/2006 | Brunswig et al. | 709/223 |
| 2008/0222121 A1 * | 9/2008 | Wiessler et al. | 707/4 |

* cited by examiner

*Primary Examiner*—Debbie Le
(74) *Attorney, Agent, or Firm*—Janaki K. Davda; Konrad Raynes & Victor LLP

(57) ABSTRACT

Provided are techniques for storing data. Invocation of a data access service is received, wherein the invocation identifies a data structure storing one or more data elements having a data format. An update handler to be plugged into a data access framework is identified, wherein the update handler processes data elements having the data format. Under control of the update handler, data elements are accessed in the data structure; one or more statements for storing the data elements into the data store are determined; and the one or more statements are forwarded to the data access framework.

28 Claims, 5 Drawing Sheets

PLUGGABLE MERGE PATTERNS FOR DATA ACCESS SERVICES

BACKGROUND

1. Field

Embodiments of the invention relate generally to pluggable merge patterns for data access services. In particular, embodiments relate to using merge patterns to store data into data stores.

2. Description of the Related Art

Relational DataBase Management System (RDBMS) software uses a Structured Query Language (SQL) interface. The SQL interface has evolved into a standard language for RDBMS software and has been adopted as such by both the American National Standards Institute (ANSI) and the International Standards Organization (ISO).

RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

A majority of object-relational persistence frameworks assume that objects are read from, and stored into, a database in a same transaction. A framework may be described as a reusable design for a software system. Examples of such frameworks include: Java® Data Objects (JDO), Enterprise JavaBeans (EJB) 2.0 (which is a Java® Application Programming Interface (API) that encapsulates business logic at a server), Hibernate (which is an object-relational mapping solution for the Java® programming language), and Java® Persistence API (JPA, which is a framework for managing relational data) (Java is a trademark of Sun Microsystems in the United States, other countries, or both). Therefore, these frameworks require that each persistence-capable object is augmented with code that allows a database engine to monitor how applications modify the object's state during a transaction. As objects are modified, they are deemed "dirty". At the end of a transaction the database engine scans all objects and stores each "dirty" object into the database. The database engine also keeps track of which objects were read from the database into the transaction and which objects were created or deleted during the transaction. Based on this lifecycle state information, in order to update the objects' state in the database, the database engine determines whether to issue an SQL INSERT statement, an SQL DELETE statement, or an SQL UPDATE statement.

The model described above may be referred to as a "stateful" model and presents problems when applied in a web server environment. This stateful model, in a web server environment, requires that the server maintain the state of persistence across multiple client requests. This stateful model also requires that every request from a particular client is always routed to the server that also maintains the state. Maintaining the server-side state for each client and bypassing a workload manager (that routes requests to servers according to workload of the servers) in order to route client requests to a fixed server limits scalability of services. Servers based on this stateful model can serve a finite number of clients in a closed corporate environment, but they cannot scale up to serve the entire World Wide Web (WWW) in the open with a large number of clients, especially as the number of clients is increasing rapidly.

A more natural and more scalable approach to operate in a web environment is to be stateless, such that objects are read and stored in different transactions. When a server receives a client request, the server reads the objects from the database, serializes them, and sends these serialized objects to the client. The server then forgets the request and any state associated with it. The client operates on the objects, and later on, may send another request to store some objects. The objects sent for storage may not necessarily be the same objects that the client originally read from the database. The objects sent for storage to the database may contain only a relevant subset of the data, or may be entirely different types of objects probably derived from the originally read objects. This shows that maintaining the state of objects originally requested by clients provide no benefit if the objects that the client requests to store later on are not the same. Moreover, there is no guarantee that the request for storing the object will be routed to the same server that served the original objects to the client. Therefore, in a typical web application, it is beneficial for the server to assume that requests for object storage are independent of requests for object reads. In other words, even if the server could carry over the state from one request to another, meaningful information might not be carried over.

The introduction of intelligent, Asynchronous Java® Script (AJAX) based clients makes the stateless server scenario even more challenging. AJAX may be described as a technique for developing interactive web applications. AJAX clients typically read graphs of data elements (e.g., eXtensible Markup Language (XML) data elements, Java® Script Object Notation (JSON) data elements, Java® objects, etc.) and cache them for a period of time. For example, a client may retrieve an existing order-graph (e.g., Order→LineItem→Product) from the server. The client may add new line items, modify existing line items, and delete existing line items. Once the client is done with processing the order, the client may want to merge the order-graph back into the server. Now that the server is stateless, the server needs sophisticated merge logic to determine how the database should be updated. There are a number of approaches for how the order-graph may be merged into the database without any state information, but which approach to use depends on the application. For example, the merge logic may use an "UPSERT" SQL-pattern to determine which line items need to be inserted or updated, and a "NOT IN" SQL-pattern to determine which line items should be deleted. Another pattern may be one in which line items that are determined to be deleted have a status field that is set to "deleted" rather than being physically deleted. Thus, a merge pattern describes how data elements are to be merged into a database.

That is, the prior art provides a number of different patterns suitable for a single use case. However, the prior art does not provide a single pattern that could cover a wide range of use cases.

Moreover, none of the available object-relational frameworks supports stateless merge. At best, conventional object-relational frameworks provide mapping metadata that can include some qualifiers, such as cascade delete, but the actual pattern that may be used to store the objects is fixed and covers a very limited number of scenarios. Therefore the burden of implementing the stateless merge logic is always on the application side and is done by the application developer (also referred to as a "developer"). This is very time consuming and error prone for the application developer.

Thus, there is a need in the art for improved merging of data elements into databases.

SUMMARY OF EMBODIMENTS OF THE INVENTION

Provided are a method, computer program product, and system for storing data. Invocation of a data access service is received, wherein the invocation identifies a data structure storing one or more data elements having a data format. An update handler to be plugged into a data access framework is identified, wherein the update handler processes data elements having the data format. Under control of the update handler, data elements are accessed in the data structure; one or more statements for storing the data elements into the data store are determined; and the one or more statements are forwarded to the data access framework.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
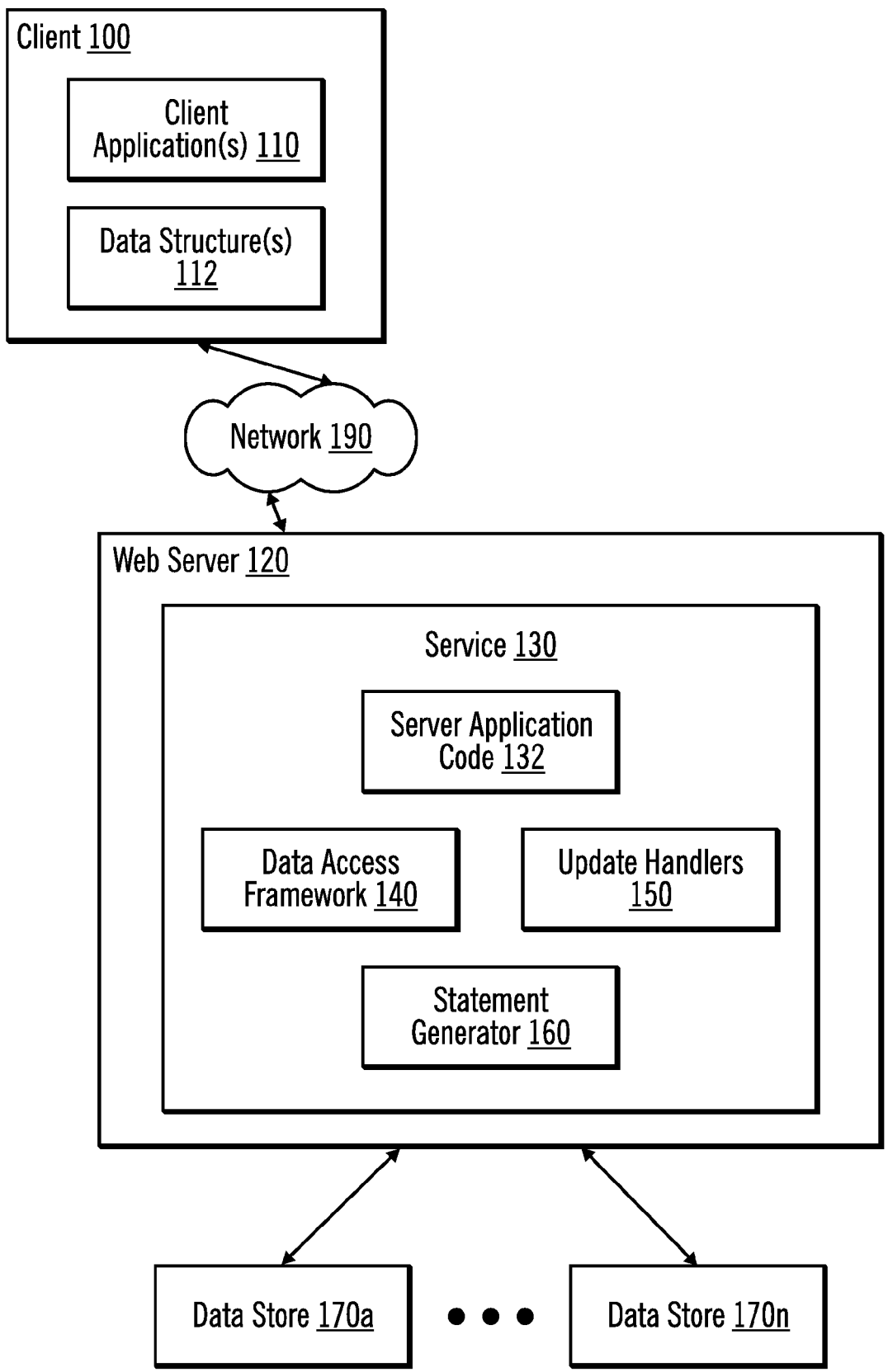
FIG. 1 illustrates details of a computing environment in accordance with certain embodiments.

FIG. 1 illustrates details of a computing environment in accordance with certain embodiments. A client 100 is connected via a network 190 to a Web server 120. The client 100 includes one or more client applications 110 and one or more data structures 112, where each data structure includes one or more data elements.

The Web server 120 includes a service 130 (i.e., a data access service). A service 130 may be described as providing some capability. A service may also be described as a piece of application code that can be remotely invoked over a network by a client application or by another service. For example, the service 130 may be a web service (e.g., provide a stock quote or a list of red toys) or a Representational State Transfer (REST) service. A REST service may be described as one in which information content is retrieved from a Web site by invoking a service that returns an XML file that describes and includes the information content. In certain embodiments, the service 130 is a stateless data access service (i.e., the service 130 provides data access to a data store 170a . . . 170n such that objects are read and stored in different transactions).

The service 130 includes server application code 132, a data access framework 140, one or more update handlers 150, and a statement generator 160. The server application code 132, a data access framework 140, one or more update handlers 150, and a statement generator 160 in the service 130 may be a same code unit (e.g., one computer readable program) or different code units (e.g., different computer readable programs) and separation in the illustration is for description purposes only.

The server application code 132 executes to respond to a client request. A data access framework 140 may be described as a set of pre-built classes and their instances that collaborate with the application code to retrieve and store data from and to the data stores 170a . . . 170n. A data access framework 140 may also be described as providing an abstraction that allows executing statements (e.g., SQL statements) against a data store 170a . . . 170n to retrieve results.

Some update handlers 150 are predefined (e.g., are pre-built by a developer who has written the data access framework 140 and are provided with the data access framework 140), while other update handlers 150 may be user-defined. Predefined update handlers may also be referred to as system provided as they are provided with the data access framework 140.

The client 100 and Web server 120 may each comprise any computing device known in the art, such as a server, mainframe, workstation, personal computer, hand held computer, laptop telephony device, network appliance, etc.

The network 190 may comprise any type of network, such as, for example, a peer-to-peer network, spoke and hub network, Storage Area Network (SAN), a Local Area Network (LAN), Wide Area Network (WAN), the Internet, an Intranet, etc.

The Web server 120 is coupled to data stores 170a . . . 170n (where "a" and "n" and the ellipses are used to indicate that any number of data stores may be coupled to the Web server 120). In certain embodiments, each data store 170a . . . 170n is a relational database. In certain embodiments, each of the data stores 170a . . . 170n may be a different RDBMS and may be capable of executing a different version of an SQL statement. Each data store 170a . . . 170n may comprise an array of storage devices, such as Direct Access Storage Devices (DASDs), Just a Bunch of Disks (JBOD), Redundant Array of Independent Disks (RAID), virtualization device, etc.

Embodiments provide a technique to merge a graph of data elements passed from the client 100 to the Web server 120 that is application-dependent. In certain embodiments, the pluggable merge patterns are implemented as update handlers 150. Pluggable merge patterns may be described as update handlers 150 that may be plugged into a data access framework 140. Thus, embodiments introduce a concept of pluggable merge patterns and a mechanism for plugging the merge logic into a data access framework 140 (e.g., a persistence framework). Embodiments provide the pluggable nature of the update handler 150 to enable data having different data formats to be inserted or updated into a data store 170a . . . 170n using a single data access framework 140.

Figure 2:
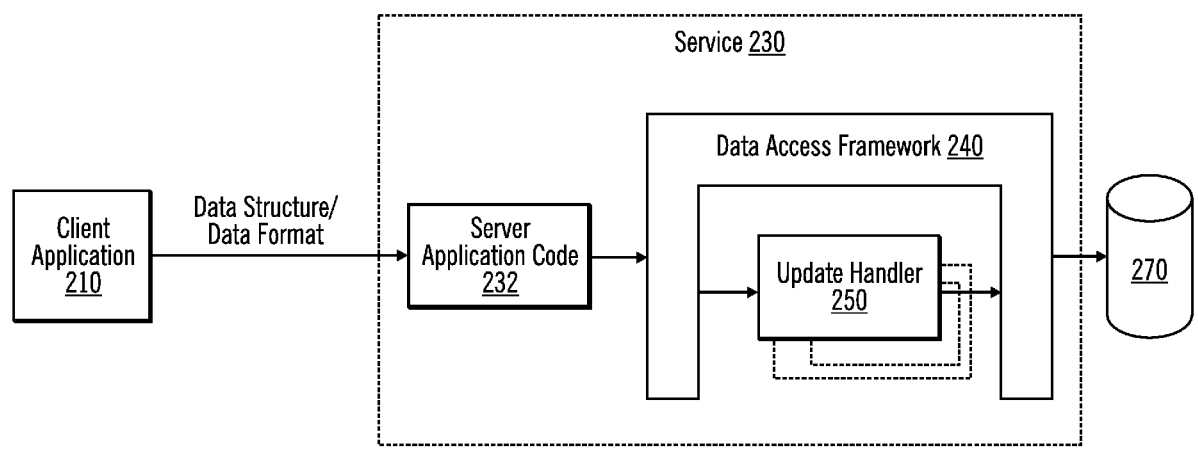
FIG. 2 illustrates an update handler diagram in accordance with certain embodiments.

FIG. 2 illustrates an update handler diagram 250 in accordance with certain embodiments. A client application 210 invokes the service 230 by providing a data structure and the data format of the data structure. A data format (or data model) may be described as a theory or specification describing how data is structured and used (e.g., the data format may be XML, JSON, Java® objects, etc.). The server application code 132 invokes the data access framework 240 by identifying the update handler 250 that is to be plugged into the data access framework 240. The update handler 250 stores the data in the data structure into a database 270.

The update handlers 250 may be described as black-boxes that encapsulate the implementation details of the merge patterns. The update handlers 250 may be generic and may be based on reflection. Reflection in the context of embodiments may be described as analyzing the data structure 112 programmatically at runtime to determine how data elements in the data structure 112 should be stored. The update handlers 250 may be user-defined (i.e., written and provided by a user) or system provided (i.e., provided with the data access framework 140).

In certain embodiments, the merge patterns are implemented using update handler objects (sometimes referred to as "UpdateHandler" objects). The update handler objects may be comprised of straightforward Java® code and JDBC® calls (JDBC is a trademark of Sun Microsystems in the United States, other countries, or both) or might leverage another framework.

Although examples herein may refer to update handler objects, update handlers 150 may be implemented in various forms. There may be a separate update handler 140 for JavaBeans® data (JavaBeans is a trademark of Sun Microsystems in the United States, other countries, or both), map (i.e., a data structure that stores key-value pairs, where each value is located in the structure based on an associated key), XML, JSON, etc.

Also, examples herein may refer to SQL statements, however, embodiments may be used with various types of statements (e.g., statements written in other languages, including XQuery, XPath, and XUpdate).

The following is an example UpdateHandler interface:

```
public class UpdateHandler
{
  // Upsert method where user provides one or more SQL statements
  public Updatehandler (Object anyObject, String mergeSQL, String
  updateSQL, String insertSQL);
  // One or more SQL statements are generated by framework
  public Updatehandler (Object anyObject);
}
```

The UpdateHandler has two constructors: (1) one in which users provide SQL statements, and the parameters include an object to be inserted or updated, and one or more SQL statements; and (2) a constructor in which the SQL statements are automatically generated (i.e., not provided by a user), and the parameter includes an object to be inserted.

The following is an example of how users may perform an upsert using the UpdateHandler when one or more SQL statements are provided by the user:

```
data.upsert (new UpdateHandler (xmlWrappedObject, mergeSql,
    updateSql, insertSql))
```

The following is an example of how users may perform an upsert using the UpdateHandler interface when one or more SQL statements are to be automatically generated (i.e., not provided by the user):

```
data.upsert (new UpdateHandler (xmlWrappedObject))
```

In certain embodiments, an implementation of an UpdateHandler interface is instantiated and passed into an update method of a data object (i.e., another object named "data"). In example (1), a BeanGraphUpdateHandler class (which is a specialized class to handle updates to a graph of JavaBeans® nodes performs an insert if a row does not exist in a data store 170a ... 170n and performs an update to an existing row otherwise. In certain embodiments, a developer provides the code of Example (1).

Example (1)

```
Data data = new Data(datasource);
BeanGraphUpdateHandler handler = new
BeanGraphUpdateHandler(Order.class);
data.update(handler,order);
```

In Example (1), "data" is an object, and the update handler is passed to the data access framework as an argument. The "order" variable is a class that is the root (parent) of a hierarchy of data elements. A hierarchy may be described as a grouping of nodes with parent child relationships, and a node in the hierarchy is a data element (e.g., in a Department→Employee→Address hierarchy, the departments, employees, and addresses are nodes). The BeanGraphUpdateHandler represents an object that understands these types of hierarchies of data elements and uses conventions (e.g., such as using a method to get a value for a particular hostvariable) to decipher the hierarchies. In Example (1), the BeanGraphUpdateHandler object is able to merge hierarchies of data elements. At runtime, the data access framework calls back the user's implemented handler code in order to perform the merge technique.

A hierarchy of data elements often contains data of different types. As a default, update handlers 150 make use of conventions to determine the SQL statements needed. However, it is often the case that customizations are made by assigning SQL statements to specific data types in the hierarchy. Embodiments provide "overrides" to enable such customizations. An override may be described as an interface that provides the update handler 150 with SQL at a given node in the hierarchy. For instance, code in Example (2) illustrates a user providing specific SQL to be executed when the BeanGraphUpdateHandler object encounters beans of type LineItem while traversing the graph of data elements. In certain embodiments, a developer provides the code of Example (2).

Example (2)

```
Data data = new Data(datasource);
BeanGraphUpdateHandler handler = new
BeanGraphUpdateHandler(Order.class);
handler.addOverrideStatements(new BeanOverride(LineItem.class),
"UPDATE line_item SET order_id =
:order_id, item_id = :item_id, quantity = :quantity",
    "INSERT line_item (order_id, item_id, quantity) VALUES
    (:order_id,:item_id,:quantity)");
data.update(handler,order);
```

In Example (2), the BeanOverride implementation of the override provides hints to the BeanGraphUpdateHandler object through UPDATE and INSERT SQL statements that are to be utilized in the merge technique when nodes of type LineItem class are found.

In certain embodiments of update handlers 150, overrides are not provided, and the update handlers 150 use reflection to analyze an input data structure 112 to determine what type of statements should be generated to store the data elements.

The generated one or more statements are executed to update the input data at the data store 170a . . . 170n.

Different types of update handlers may be defined. For example, a custom merge update handler may be built to take advantage of merge statements provided by different data stores 170a . . . 170n.

Also, update handlers 150 may include features such as, update-only handler (i.e., that updates without performing insertions), UPSERT handler (where if a row already exists in the data store 170a . . . 170n, the row is updated, otherwise, a new row is inserted), cascade-delete handler (that physically deletes rows of a table), cascade-mark-delete handler (that marks the rows to be deleted instead of physically deleting them), and handlers primed with SQL that know how to mark rows.

Update handlers 150 may combine reusable components for graph-walking and sub-graph updating. Graph walking is performed to walk through a graph of data elements, i.e. to enumerate the data elements. The sub-graph updating is performed to store the fields of data elements into columns of a table in the data store 170a . . . 170n. Storing the data elements includes knowing how to locate SQL statements to perform the storing or to generate the appropriate SQL statements to perform the storing. Update handlers 150 are also able to extract data elements from the graph (also referred to as decomposition).

Update handlers 150 may take into account RDBMS constraints and order modifications to prevent constraint violations. For example, inserts are performed before deletes for foreign key constraints.

Figure 3:
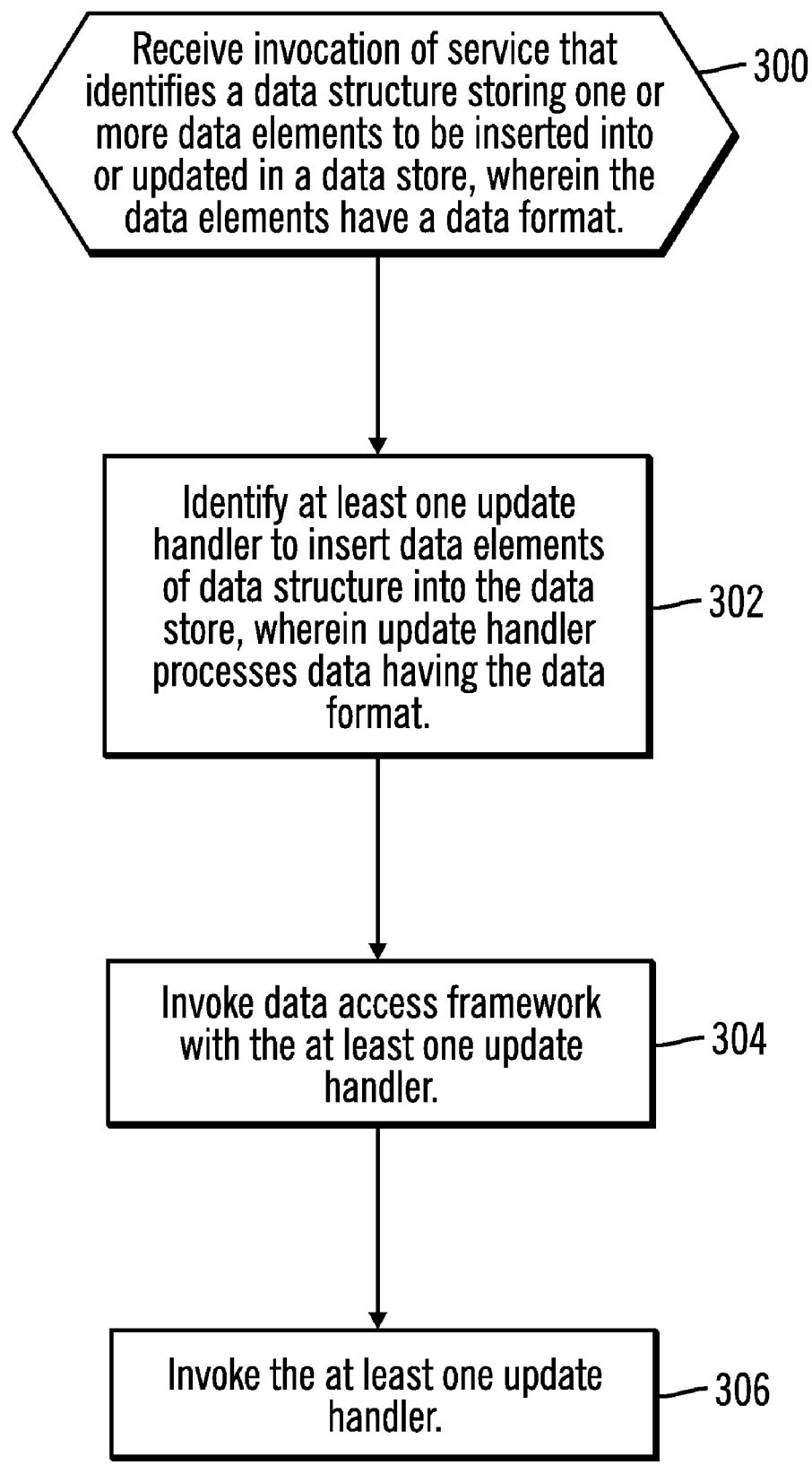
FIG. 3 illustrates logic for invoking an update handler in accordance with certain embodiments.

FIG. 3 illustrates logic for invoking an update handler in accordance with certain embodiments. Control begins at block 300 with the service application code 132 receiving invocation of the service 130 from a client application 110. The invocation identifies a data structure 112 storing one or more data elements to be inserted into (i.e., stored in) or updated in the data store 170a . . . 170n, wherein the data elements have a data format. In block 302, the service application code 132 identifies at least one update handler 150 to insert the data elements of the data structure 112 into the data store 170a . . . 170n, where the update handler 150 stores data elements having the data format. In alternative embodiments, the update handler 150 is automatically identified (e.g., by the data access framework 140) based on introspecting data elements in the data structure 112 (e.g., if the data structure 112 has data elements in an XML format, an update handler 150 for processing XML data is selected). In block 304, the service application code 132 invokes the data access framework 140 with the at least one update handler 150. In block 306, the data access framework 140 invokes the at least one update handler 150.

Figure 4:
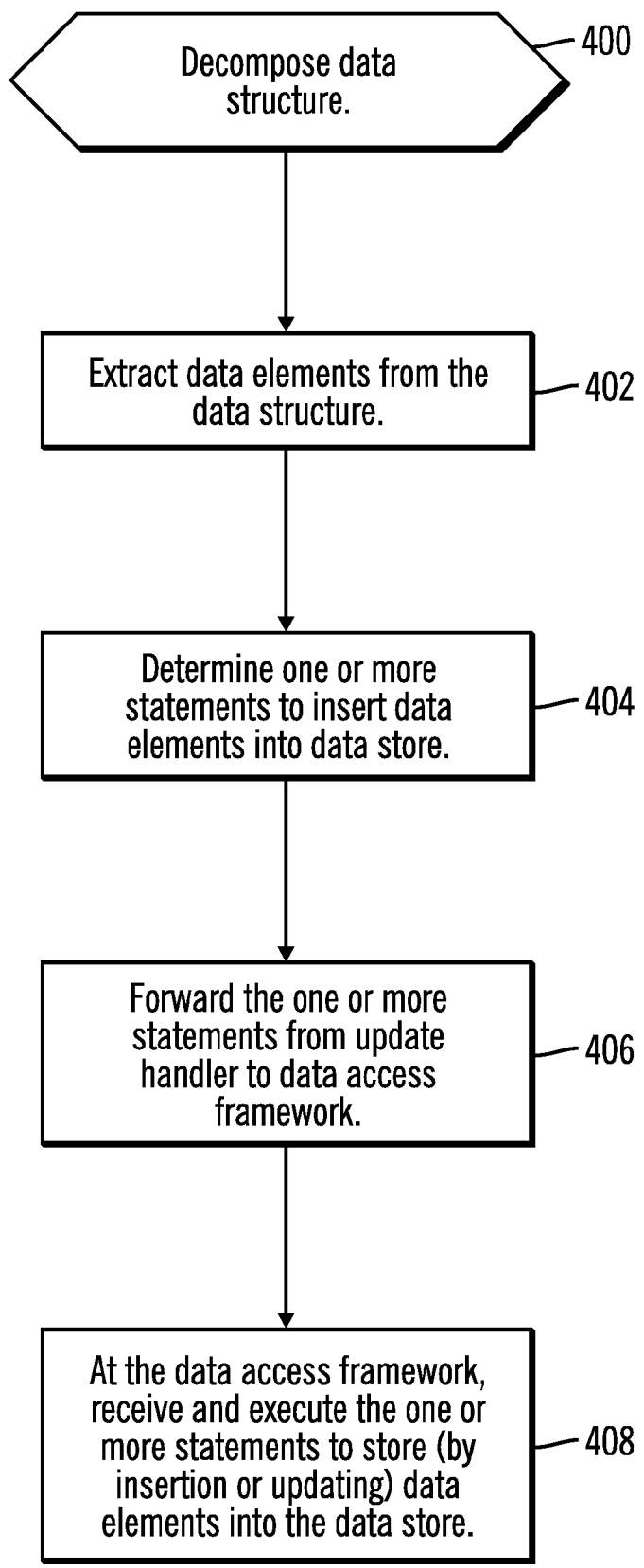
FIG. 4 illustrates logic performed to store data elements into a data store in accordance with certain embodiments.

FIG. 4 illustrates logic performed to store data elements into a data store 170a . . . 170n in accordance with certain embodiments. Control begins at block 400 with the update handler 150 decomposing a data structure 112. In block 402, the update handler 150 extracts data elements from the data structure 112. In certain embodiments, the decomposing and extracting comprise accessing data elements in the data structure. In block 404, the update handler 150 determines (i.e., identifies) one or more statements (e.g., SQL statements). In certain embodiments, identifying includes generating the one or more statements using column names and table names in the data structure 112. In certain embodiments, the one or more statements are generated at runtime with a statement generator 160. In certain embodiments, the update handler 150 extracts data elements having one format (e.g., XML) and generates one or more statements to store the extracted data elements in an RDBMS in a relational format. Thus, the update handler 150 does not necessarily store the extracted data elements in the data store 170a . . . 170n in the base (i.e., original) data format. For example, an XMLUpdateHandler. XMLUpdateHandler knows how to pull the data elements out of an XML document and store the extracted data elements in RDBMS in relational format. In this manner, the user does not need to convert the data elements from one format (e.g., XML format) to an intermediate format (e.g., JavaBean® format or a map) and then insert the data elements into the data store.

In block 406, the update handler 150 forwards the one or more statements to the data access framework 140. In block 408, the data access framework 140 executes the statements received from the update handler 150 to store the data elements in the data store 170a . . . 170n. Storing the data elements may be either inserting the data elements or using the data elements to update existing data elements in the data store 170a . . . 170n.

Thus, a stateless data access service 130 invokes the data access framework 140 and tells the data access framework 140 which update handler 150 to use. The data access framework 140 invokes the update handler 150. The update handler 150 returns one or more statements to the data access framework 140, and the data access framework 140 executes the one or more statements.

Thus, an update handler 150 includes logic for how a data structure 112 is to be decomposed and logic for how data is to be stored. Different update handlers 150 may be used for storing different data formats (e.g., XML, JSON, Java® objects, etc.).

Thus, pluggable merge patterns benefit application developers at the server end. Unlike general purpose persistence frameworks, each merge pattern is specific to a particular use case, and, therefore, can be highly optimized for that particular use case. The ability to customize and plug merge patterns according to specific requirements of an application comes from the fact that a library of merge patterns for the most common use cases can exist independently. Such pluggability eliminates the need to describe a complex mapping for each graph of data elements and to augment the application code in areas where the mapping languages lacks expressiveness. This capability allows developers to simply choose which merge pattern to use in order to merge the updated graph of data elements with the one that exists in the data store 170a . . . 170n.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3 and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3 and 4 may be implemented in software, hardware, programmable and non-programmable gate array logic or in some combination of hardware, software, or gate array logic.

Figure 5:
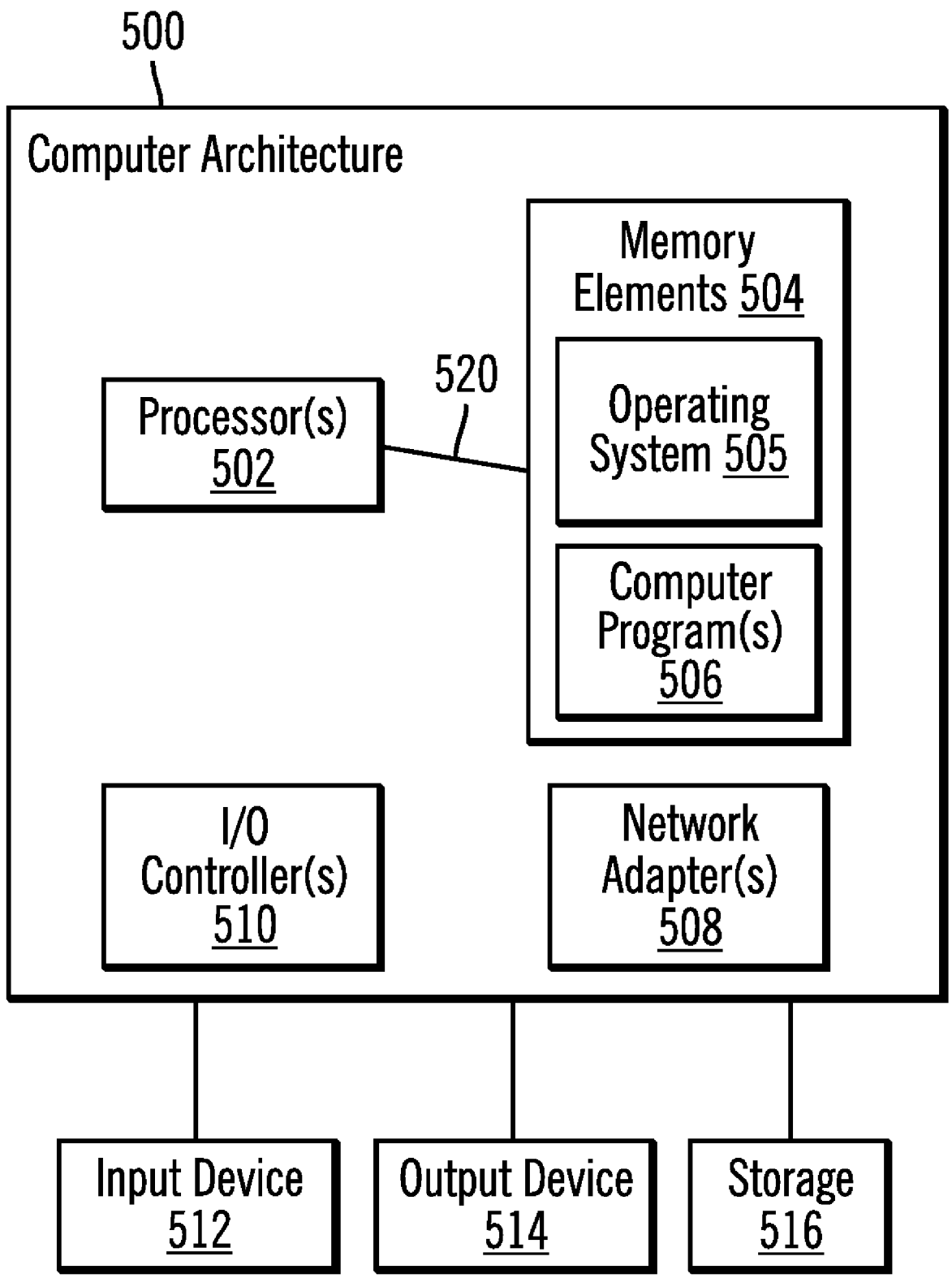
FIG. 5 illustrates a system architecture that may be used in accordance with certain embodiments.

FIG. 5 illustrates a system architecture 500 that may be used in accordance with certain embodiments. Client 100 and/or Web server 120 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:

receiving, with a computer including a processor, invocation of a data access service, wherein the invocation identifies a data structure storing one or more data elements having a data format;

identifying an update handler from a plurality of update handlers to be plugged into a data access framework, wherein the identified update handler processes data elements having the data format;

invoking the data access framework with the update handler;

under control of the data access framework, invoking the update handler;

under control of the update handler,
    accessing data elements in the data structure;
    determining one or more statements for storing the data elements into a data store; and
    forwarding the one or more statements to the data access framework; and
under control of the data access framework,
    receiving the one or more statements; and
    executing the one or more statements to store the data elements into the data store.

2. The method of claim 1, wherein accessing further comprises:
    decomposing the data structure; and
    extracting data elements from the data structure.

3. The method of claim 1, wherein the data access service, the data access framework, and the update handler comprise a same code unit.

4. The method of claim 1, wherein the data access service, the data access framework, and the update handler comprise different code units.

5. The method of claim 1, further comprising:
    performing introspection of the data elements in the data structure to identify the update handler.

6. The method of claim 1, wherein identifying the one or more statements further comprises:
    generating the one or more statements using column names and table names in the data structure, wherein the one or more statements are Structured Query Language (SQL) statements.

7. The method of claim 1, wherein the invocation includes an override that identifies one or more statements to be executed for a particular type of data element.

8. The method of claim 1, further comprising:
    under control of the update handler, using reflection to analyze the data structure to determine what type of the one or more statements are to be generated to store the data elements into the data store.

9. The method of claim 1, further comprising:
    under control of the data access service, invoking the data access framework.

10. The method of claim 1, wherein the data structure comprises a first data structure storing data elements having a first data format and further comprising:
    receiving a second data structure storing data elements having a second data format; and
    identifying a new update handler to be plugged into the data access framework, wherein the new update handler processes data elements having the second data format.

11. A computer program product comprising a computer-readable storage medium including at least one computer readable program, wherein the at least one computer readable program when executed on a computer causes the computer to:
    receive invocation of a data access service, wherein the invocation identifies a data structure storing one or more data elements having a data format;
    identify an update handler from a plurality of update handlers to be plugged into a data access framework, wherein the identified update handler processes data elements having the data format;
    invoke the data access framework with the update handler;
    under control of the data access framework, invoke the update handler;
    under control of the update handler,
        access data elements in the data structure;
        determine one or more statements for storing the data elements into a data store; and
        forward the one or more statements to the data access framework; and
    under control of the data access framework,
        receive the one or more statements; and
        execute the one or more statements to store the data elements into the data store.

12. The computer program product of claim 11, wherein when accessing, the at least one computer readable program when executed on a computer causes the computer to:
    decompose the data structure; and
    extract data elements from the data structure.

13. The computer program product of claim 11, wherein the data access service, the data access framework, and the update handler comprise one computer readable program.

14. The computer program product of claim 11, wherein the data access service, the data access framework, and the update handler comprise different computer readable programs.

15. The computer program product of claim 11, wherein the at least one computer readable program when executed on a computer causes the computer to:
    perform introspection of the data elements in the data structure to identify the update handler.

16. The computer program product of claim 11, wherein the at least one computer readable program when executed on a computer causes the computer to:
    generate the one or more statements using column names and table names in the data structure, wherein the one or more statements are Structured Query Language (SQL) statements.

17. The computer program product of claim 11, wherein the invocation includes an override that identifies one or more statements to be executed for a particular type of data element.

18. The computer program product of claim 11, wherein the at least one computer readable program when executed on a computer causes the computer to:
    under control of the update handler, use reflection to analyze the data structure to determine what type of the one or more statements are to be generated to store the data elements into the data store.

19. The computer program product of claim 11, wherein the at least one computer readable program when executed on a computer causes the computer to:
    under control of the data access service, invoke the data access framework.

20. The computer program product of claim 11, wherein the data structure comprises a first data structure storing data elements having a first data format and wherein the at least one computer readable program when executed on a computer causes the computer to:
    receive a second data structure storing data elements having a second data format; and
    identify a new update handler to be plugged into the data access framework, wherein the new update handler processes data elements having the second data format.

21. A system, comprising:
    hardware logic capable of performing operations, the operations comprising:
        receiving invocation of a data access service, wherein the invocation identifies a data structure storing one or more data elements having a data format;
        identifying an update handler from a plurality of update handlers to be plugged into a data access framework, wherein the identified update handler processes data elements having the data format;

invoking the data access framework with the update handler;

under control of the data access framework, invoking the update handler;

under control of the update handler, accessing data elements in the data structure;

determining one or more statements for storing the data elements into a data store; and forwarding the one or more statements to the data access framework; and under control of the data access framework, receiving the one or more statements; and executing the one or more statements to store the data elements into the data store.

22. The system of claim 21, wherein the operations further comprise:

performing introspection of the data elements in the data structure to identify the update handler.

23. The system of claim 21, wherein the operations for identifying the one or more statements further comprise:

generating the one or more statements using column names and table names in the data structure, wherein the one or more statements are Structured Query Language (SQL) statements.

24. The system of claim 21, wherein the invocation includes an override that identifies one or more statements to be executed for a particular type of data element.

25. The system of claim 21, wherein the operations further comprise:

under control of the update handler, using reflection to analyze the data structure to determine what type of the one or more statements are to be generated to store the data elements into the data store.

26. The system of claim 21, wherein the operations further comprise:

under control of the data access service, invoking the data access framework.

27. The system of claim 21, wherein the data structure comprises a first data structure storing data elements having a first data format and wherein the operations further comprise:

receiving a second data structure storing data elements having a second data format; and identifying a new update handler to be plugged into the data access framework, wherein the new update handler processes data elements having the second data format.

28. The system of claim 21, wherein the operations for accessing further comprise:

decomposing the data structure; and extracting data elements from the data structure.

* * * * *